United States Patent [19]
Gibson, Jr. et al.

[11] 3,970,150
[45] July 20, 1976

[54] METHOD AND APPARATUS FOR HARVESTING CROPS

[76] Inventors: Robert R. Gibson, Jr., 649 'C' St., Lemoore, Calif. 93245; Joo I. Kim, 5275 N. Fresno St., No. 102, Fresno, Calif. 93710

[22] Filed: Dec. 5, 1974

[21] Appl. No.: 529,802

[52] U.S. Cl. .............................. 171/56; 56/327 R
[51] Int. Cl.² ........................................ A01D 23/06
[58] Field of Search .......... 171/56; 56/327 R, 327 A

[56] References Cited
UNITED STATES PATENTS

| | | | |
|---|---|---|---|
| 784,040 | 3/1905 | Fellenz | 171/56 |
| 1,166,762 | 1/1916 | Holub | 171/56 X |

*Primary Examiner*—Hugh R. Chamblee
*Attorney, Agent, or Firm*—Huebner & Worrel

[57] ABSTRACT

A method and apparatus for harvesting crops, such as mushrooms, wherein the method comprehends the growing of the crops in rows and the apparatus has a mobile frame adapted for transport along the row; a driven picking assembly mounted on the frame for rotational movement about an axis extending substantially transversely of the frame and having pairs of opposed, radially extending arms mounted thereon for pivotal movement toward and from each other; guides borne by the frame defining first paths of travel for the pairs of arms laterally of a picking station and second paths of travel for the pairs of arms toward each other into juxtaposition in the picking station; a sensing mechanism mounted on the frame adapted to detect crops in the row of predetermined maturity; and a control mechanism borne by the frame interconnecting the sensing mechanism and the guides adapted to direct a pair of opposed arms into the second paths of travel upon detection of a mature drop to pick the crop in the picking station.

17 Claims, 14 Drawing Figures

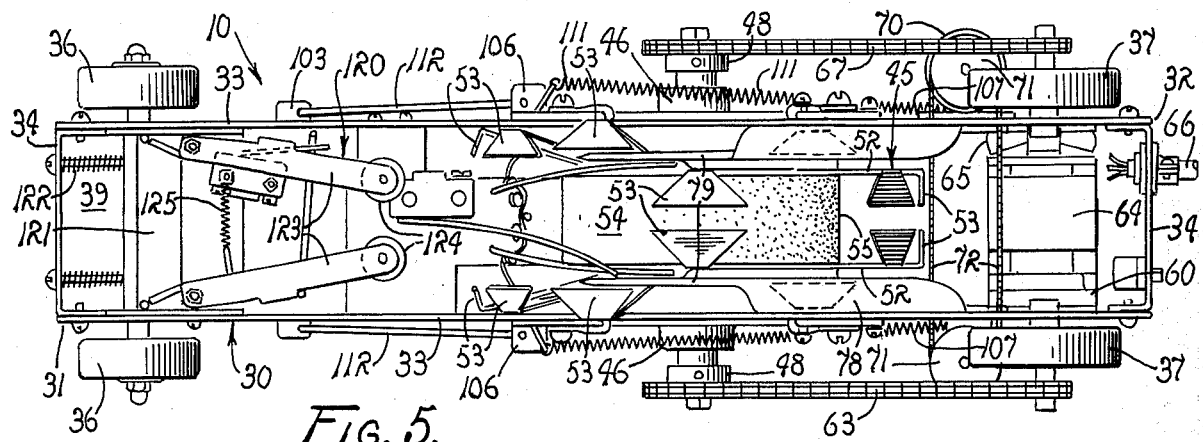
FIG. 5.
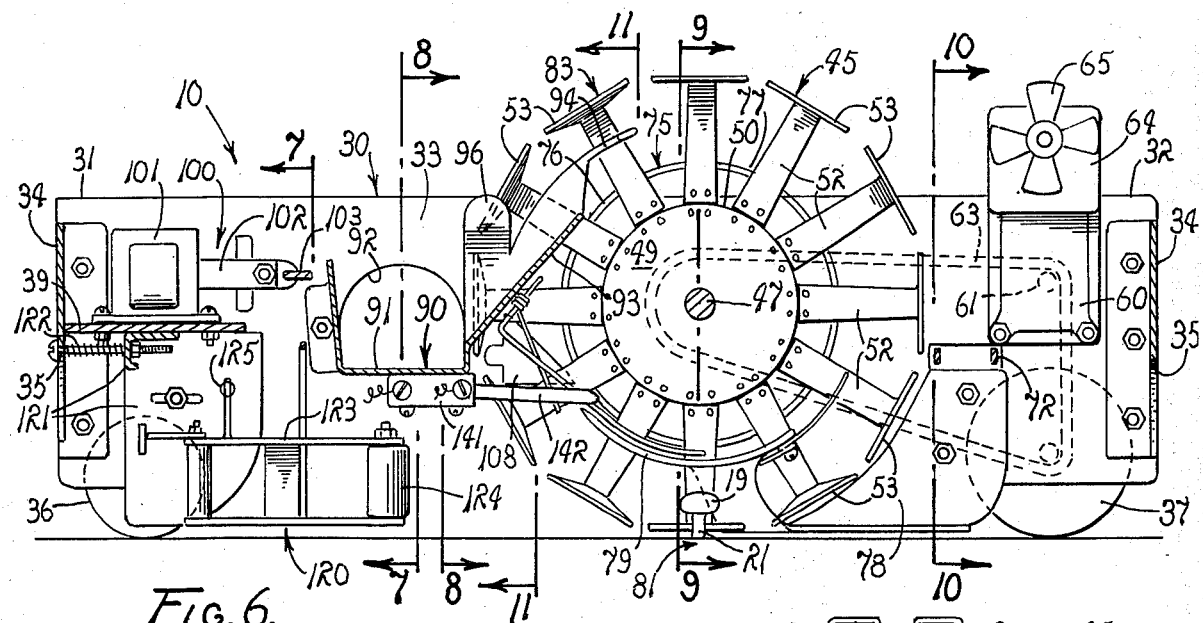
FIG. 6.
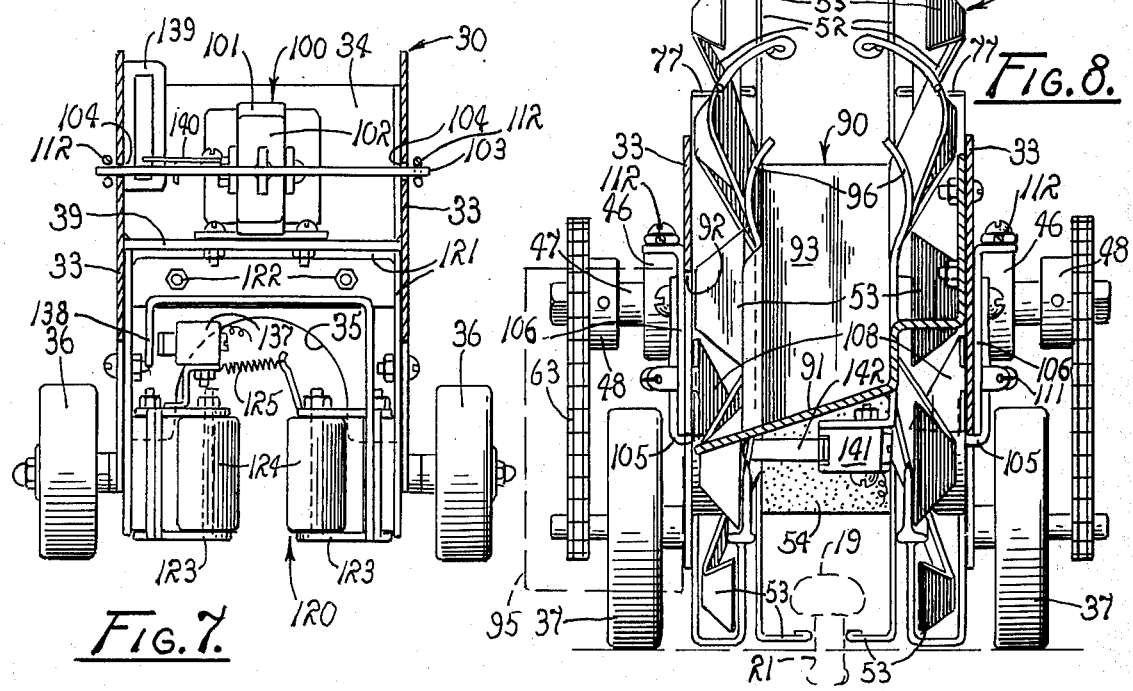
FIG. 7.
FIG. 8.

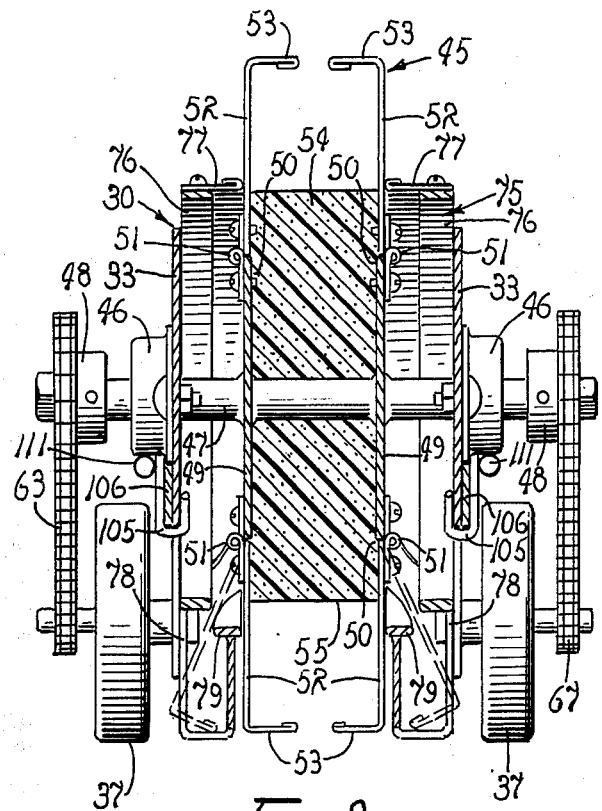
FIG. 9.
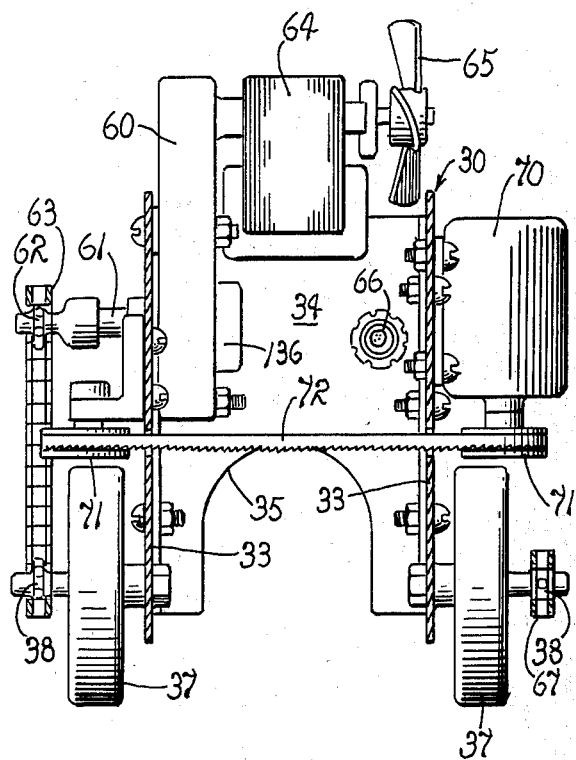
FIG. 10.
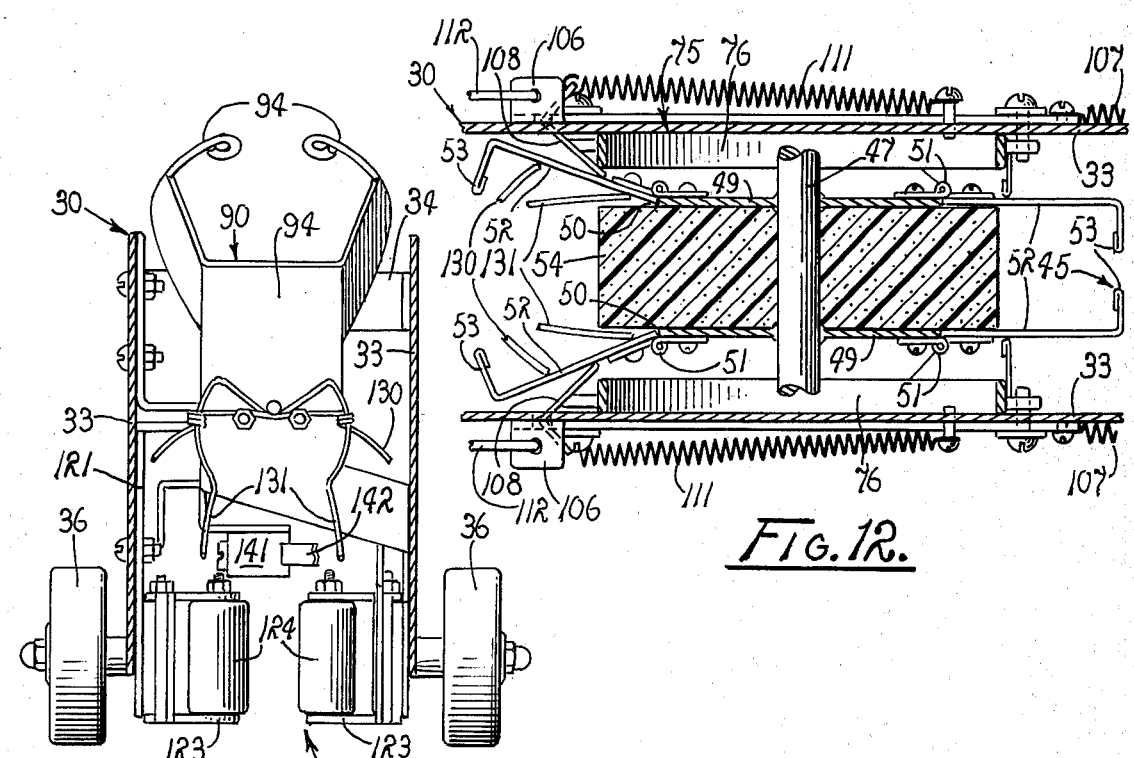
FIG. 11.
FIG. 12.

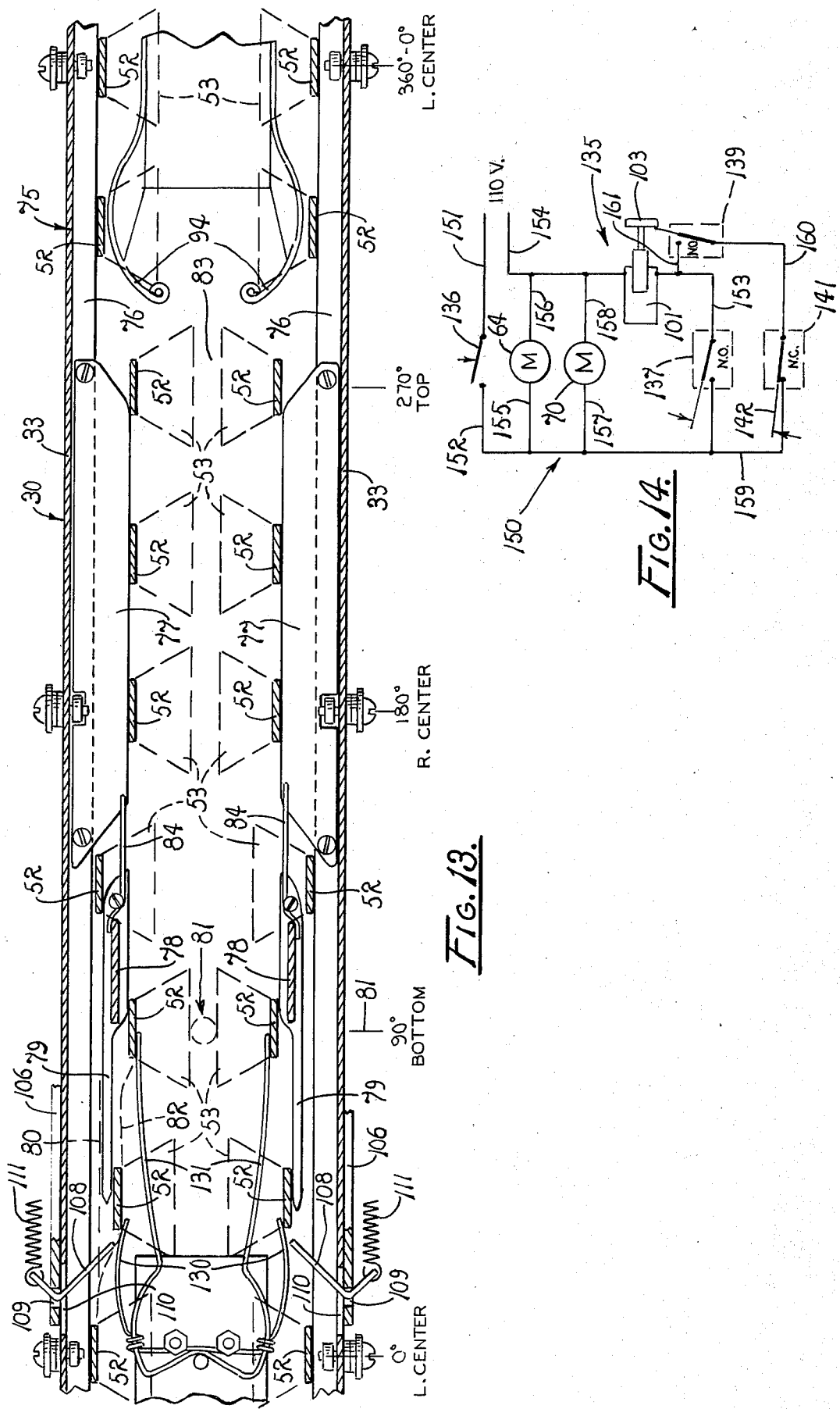

METHOD AND APPARATUS FOR HARVESTING CROPS

BACKGROUND OF THE INVENTION

The present invention relates to a method and apparatus for harvesting crops and more particularly to such a method and apparatus particularly well suited to the harvesting of mushrooms grown on a commercial scale which have conventionally required repetitious manual harvesting operations.

As the commercial demand for mushrooms has expanded, considerable effort has been directed to the development of mechanical harvesting devices capable of eliminating the necessity for manual harvesting of the product. Although the prior art, as typified by the Verhoff U.S. Pat. No. 1,787,026; the Schumacher U.S. Pat. No. 2,202,433; the Sinden et al U.S. Pat. No. 3,624,990; the Persson U.S. Pat. No. 3,635,005; and the Bradbury U.S. Pat. No. 3,679,002, evidences several devices reputed to permit such automated harvesting of mushrooms, considerable difficulties reside in their operation which have prevented the general use of such devices by the industry. These problems are believed to have been overcome by the method and apparatus of the present invention.

Mushrooms are grown in enclosures naturally or artificially possessing the appropriate environmental conditions of humidity, temperature, and low illumination conducive to their rapid growth and efficient production. Efficiency directs that every available area within the enclosure be utilized for growing of the mushrooms. Consequently, the mushrooms are grown commercially in tables containing a growing medium disposed in horizontal tiers vertically separated by distances of approximately 12 inches permitting access to the mushrooms for harvesting.

In optimum environmental conditions, mushrooms grow rapidly and frequently double or triple in size in a 24-hour period. Consequently, the mushrooms must ordinarily be harvested on a daily basis in order to produce mushrooms of uniform quality. Such rapid growth has conventionally required manual harvesting in order to allow discriminate selection of only uniformly mature mushrooms. This is accomplished with the aid of an artificial light source, by reaching between the tiers to pick those mushrooms, determined by visual observation, to be of a mature size suitable for harvesting. This is a laborious and inefficient operation since the mushrooms are frequently difficult to reach between the tiers, they are easily damaged by contact during harvesting, and it is often difficult rapidly to observe which mushrooms are of a mature quality because of the limited space between the tiers.

Thus, it has long been realized that the development of a reliable method and apparatus for harvesting crops, such as mushrooms, capable of discriminately harvesting only those crops of a predetermined maturity without damage either to the harvested crops or to those passed over would be of considerable value to the industry in reducing the expense of production while improving the uniformity of the quality of the harvested crops and assisting in permitting the expansion of production.

SUMMARY OF THE INVENTION

It is therefore an object of the present invention to provide an improved method and apparatus for harvesting crops.

Another object is to provide such a method and apparatus having particular utility in the harvesting of mushrooms grown on a commercial scale.

Another object is to provide such a method which permits mushrooms to be grown in rows suitable for automated harvesting.

Another object is to provide such a method which permits mushrooms to be harvested by pulling them from the growing medium so as to avoid the necessity for severing their stalks thereby permitting new mushrooms to grow in the places of those harvested without further attention to the growing medium for removal of the severed portions.

Another object is to provide such a method which results in the growth of mushrooms at controlled positions connected to their supporting mycelium culture by a minimum development of strands of mycelium so as to insure controlled growth and ease of harvesting.

Another object is to provide such an apparatus which is operable discriminately to detect and harvest only those crops having reached a predetermined state of maturity while leaving immature crops in place for further growth and which has particular utility in the harvesting of mushrooms.

Another object is to provide such an apparatus which is operable without manual assistance to harvest mushrooms in confined areas without risk of damage to the mushrooms.

Another object is to provide such an apparatus which does not require the determination of crop maturity to be made by visual observation.

Another object is to provide such an apparatus which automatically trims the stalks of mushrooms during harvesting so as to produce mushrooms of uniform size and quality without further processing.

Another object is to provide such an apparatus which is capable of use in teams permitting the harvesting of all of the mature mushrooms grown on a given table in a single harvesting operation.

Further objects and advantages are to provide improved elements and arrangements thereof in a method and apparatus for the purposes described which are dependable, economical, durable and fully effective in accomplishing their intended purposes.

BRIEF DESCRIPTION OF THE DRAWINGS

FIG. 5 is a bottom plan view of the apparatus.

FIG. 6 is a longitudinal vertical section of the apparatus taken from a position generally indicated by line 6—6 in FIG. 3.

FIG. 7 is a transverse vertical section taken from a position generally indicated by line 7—7 in FIG. 6.

FIG. 8 is a transverse vertical section taken from a position generally indicated by line 8—8 in FIG. 6.

FIG. 9 is a transverse vertical section taken from a position indicated by line 9—9 in FIG. 6.

FIG. 10 is a transverse vertical section taken from a position indicated by line 10—10 in FIG. 6.

FIG. 11 is a transverse vertical section taken from a position generally indicated by line 11—11 in FIG. 6.

FIG. 12 is a fragmentary horizontal section taken from a position generally indicated by line 12—12 in FIG. 4.

FIG. 13 is a horizontal development of the guide assembly defining the circular paths of travel of the picking arms of the apparatus.

FIG. 14 is a schematic diagram of the electrical circuit for the apparatus.

DESCRIPTION OF THE PREFERRED EMBODIMENT

Figure 4:
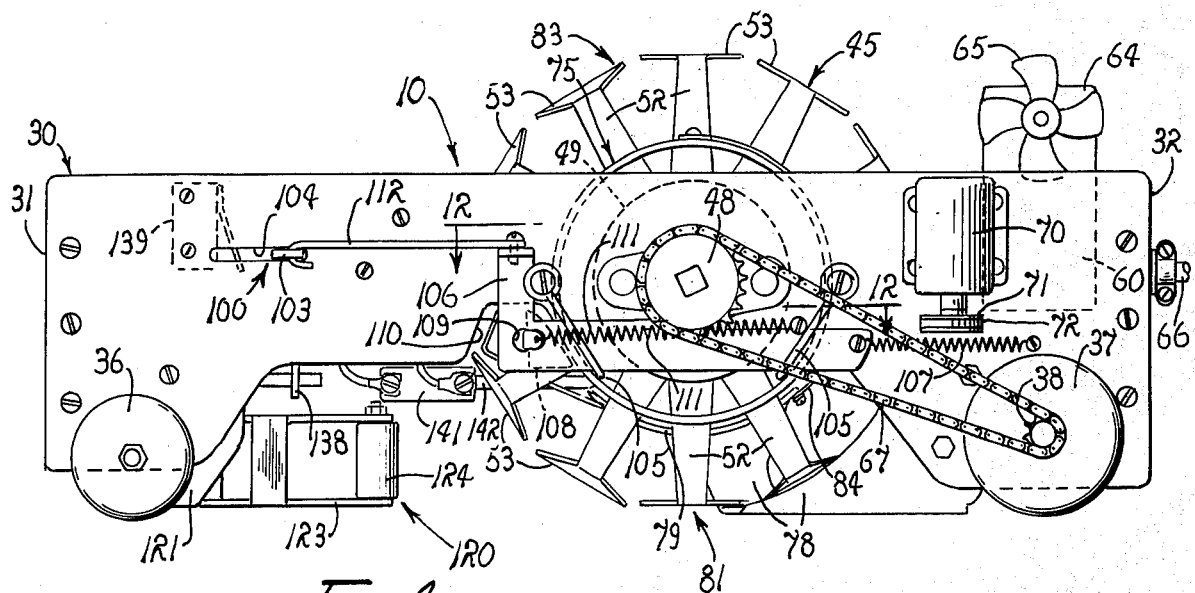
FIG. 4 is a side elevation of the apparatus.

Referring more particularly to the drawings, the apparatus of the present invention is generally indicated by the numeral 10 in FIG. 4. It will be recognized that the apparatus, as well as the method, of the present invention is adaptable for use in harvesting a wide variety of crops to permit the discriminate selection of only those growths of the crop of a predetermined maturity. However, as has previously been noted, the method and apparatus of the present invention are particularly well suited to the growth and harvesting of mushrooms.

One of the difficulties attendant to the development of a satisfactory mushroom harvester has been the difficulty in introducing the mushrooms to the harvester in an orderly fashion during movement of the harvester thereover. While previous attempts have been made to grow the mushrooms in rows for this purpose, these previous attempts have not been entirely satisfactory. Thus, the method of the present invention comprehends the use of procedures which have been found to insure that mushrooms are grown in uniform rows conducive to automated harvesting.

Figure 1:
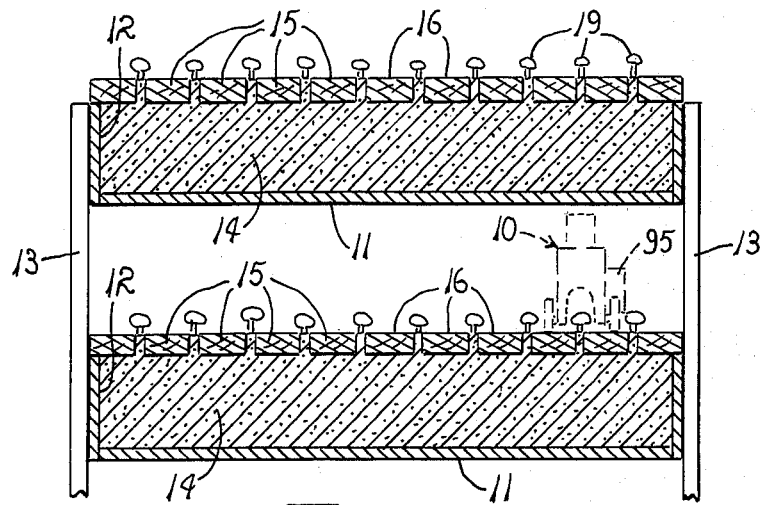
FIG. 1 is a fragmentary transverse vertical section of a series of tables for growing mushrooms in accordance with the provisions of the method of the present invention.
Figure 2:
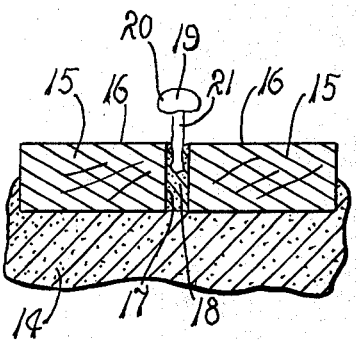
FIG. 2 is a somewhat enlarged fragmentary transverse vertical section of a portion of one table.

The practice of the method of the present invention can best be visualized in FIGS. 1 and 2. As shown fragmentarily in FIG. 1, conventional practice calls for the growing of mushrooms in beds or tables 11, having upwardly facing receptacles 12, disposed in tiers which are vertically spaced a predetermined, relatively small distance, such as approximately 12 to 13 inches. The tables are secured in this arrangement by a suitable frame 13. Conventionally, the receptacle of each table is filled with a growing medium 14 known in the industry as "composting material" of a type suitable for the growth of a mycelium culture which produces mushrooms. The mycelium culture is then introduced to the growing medium which under the proper environmental conditions of humidity, temperature and light produces mushrooms. Thus, conventionally the mushrooms are raised in the growing medium on a haphazard or random basis without definition or control of growth.

The method of the present invention embraces the control of such growth by the extension of a plurality of planks 15, having upper surfaces 16, across the tables 11 in rested relation on the growing medium 14. The planks are disposed in spaced parallel relation so as to define interstices therebetween of narrow width, such as approximately ½ inch. Each interstice is then filled with a nonfertile casing material 18 throughout the length and width of the interstice preferably to a level corresponding approximately to the upper surface 16 of the planks, as best shown in FIG. 2. A suitable casing material is composed of appropriate amounts of hydrated lime, peat moss and sand, but a variety of nonfertile compositions can be employed.

It has been found that the presence of the planks 15 does not impede the growth of mycelium within the growing medium 14, but that the presence of the nonfertile casing material 18 operates to control the growth of the mycelium culture into the interstices between the planks. This prevents the erratic growth of the mycelium culture and therefore the mushrooms produced thereby beyond the area of the interstices. The mushrooms are thus grown in well defined rows within the interstices. For illustrative convenience, the growths or mushrooms are indicated by the numeral 19 herein individually having a cap 20 and a stalk 21.

Conventional harvesting of mushrooms 19 calls for the severing of their stalks 21. The severed portion of each mushroom left in place, however, prevents the growth of a new mushroom in the same place thus requiring removal for continued mushroom production subsequent to such harvesting. It has been found, however, that if the mushrooms are harvested by pulling them from the nonfertile casing material 18 between the planks, so as to remove all of each mushroom within the nonfertile material, new mushrooms will grow in the place of the harvested mushrooms without further preparation or attention to the growing medium 14 or casing material 18. Since the casing material limits the growth of mycelium within the interstice to that necessary to sustain the growth of mushrooms, pulling of the mushrooms in accordance with the method of the present invention is readily accomplished with only a minimal amount of strands of mycelium resisting such removal and perhaps being carried therewith. Thus, the method of the present invention additionally calls for the harvesting of the mushrooms by pulling them from the casing material so as to avoid the necessity of severing the stalks and the detriments attendant thereto.

The apparatus 10 of the present invention has a mobile frame 30 having a forward portion 31 and a rearward portion 32. The frame is composed of elongated substantially parallel side walls 33 interconnected at the forward and rearward portions of the frame by end walls 34. Each of the end walls has an opening 35 therein defining a path of travel longitudinally of the mobile frame for the passage of a row crop through and relative to the apparatus. A pair of front wheel assemblies 36 are individually mounted on the side walls on the forward portion of the frame. A pair of rear wheel assemblies 37 are mounted on the rearward portion of the frame each having a sprocket 38 extended outwardly therefrom. A horizontal platform 39 is mounted on the side walls 33 extending therebetween in the forward portion of the frame, as can best be seen in FIG. 6.

A picking wheel assembly is generally indicated by the numeral 45 and is mounted on and extended between the side walls 33 of the mobile frame 30. The picking wheel assembly has a pair of bearings 46 individually mounted on the side walls 33 in alignment transversely of the frame. A mounting shaft 47 is rotationally received in the bearings so as to extend outwardly therethrough laterally on opposite sides of the frame. A pair of sprockets 48 are individually affixed on the remote ends of the mounting shaft, as best shown in FIG. 5. A pair of spaced, substantially parallel circular plates 49 are fixedly secured on the mounting shaft substantially concentrically thereto and having peripheral edges 50. A plurality of hinge assemblies 51 are borne on the peripheral edges of the plates in spaced relation thereabout. The hinge assemblies of each plate are matched in juxtaposed pairs with corresponding hinge assemblies of the opposite plate. Each of the hinge assemblies mounts a picking arm 52 having at its remote end a right-angularly extending grasping or picking portion 53. Thus, as can best be seen in FIG. 3, the picking arms are matched in opposed pairs which are pivotal toward and from each other transversely of the mobile frame. A foam cushion 54 is fastened on the mounting shaft between the plates extending outwardly to define a peripheral surface 55 in predetermined spaced relation to the picking portions of the picking arms.

A suitable transmission 60 is mounted on one side wall 33 of the mobile frame 30 in the rearward portion 32 thereof, as best shown in FIG. 10. The transmission has an output shaft 61 extending through the side wall, laterally of the frame and mounting a sprocket 62 on the remote end thereof in coplanar relation to sprockets 38 and 48 on that side of the frame. A drive chain 63 interconnects sprockets 38, 48 and 62 on that common side of the frame. An electric drive motor 64 is mounted on the transmission in driving relation thereto. The drive motor mounts a cooling fan 65 and is adapted for connection to a source of electrical energy by an electric cord 66. A take off chain 67 interconnects sprocket 48 and 38 on the opposite side of the frame. Thus, operation of the drive motor directly drives the rear wheel assembly 37 and mounting shaft 47 on the side of the frame mounting sprocket 62 and through the mounting shaft 47 drives the rear wheel assembly 37 on the opposite side of the frame through take off chain 67. The picking wheel assembly 45 is thus operated simultaneously with the operation of the rear wheel assemblies 37. Through the various sprocket ratios involved, the picking portions 53 of the arms 52 are preferably rotated with the picking wheel assembly at approximately the ground speed of the frame.

Figure 3:
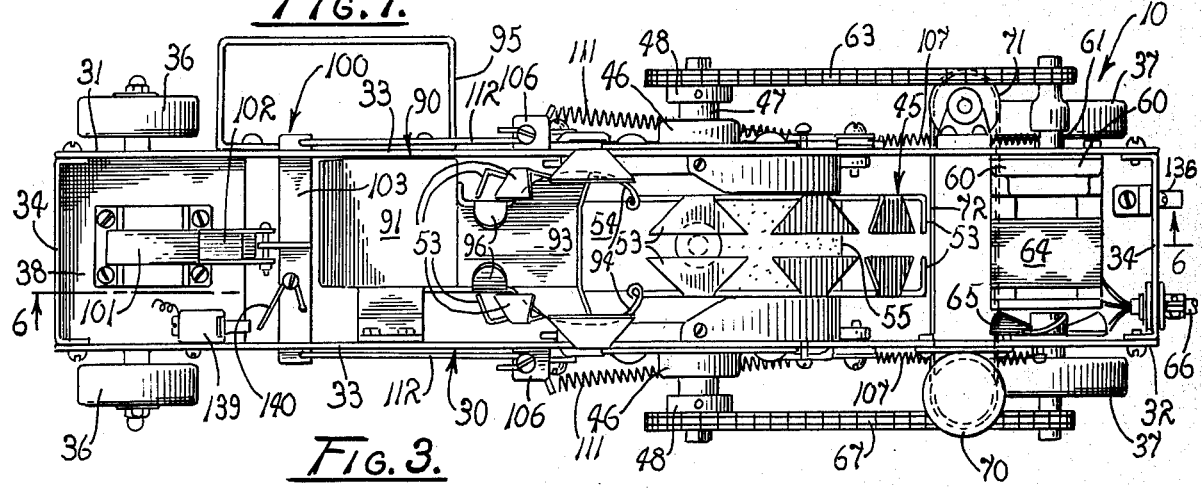
FIG. 3 is a top plan view of the apparatus of the present invention.

A band saw motor 70 is mounted on the side wall 33 opposite that mounting the transmission 60 in the position shown in FIGS. 3 and 4. A sheave assembly 71 is mounted in a corresponding position on the opposite side wall. A band saw blade 72 operably interconnects the motor and sheave assembly in driven relation extending through suitable openings in the side walls and transversely through the frame immediately adjacent to the picking wheel assembly.

The mobile frame 30 mounts a guide assembly 75 which can best be seen in FIGS. 5, 6, 8, 9 and 11 through 13. The guide assembly is composed of a pair of guide rings 76 secured on the side walls 33 facing inwardly of the frame substantially concentric to the mounting shaft 47. The mounting rings are spaced outwardly from the hinge assemblies 51 and define lateral limits for pivotal movement of the picking arms 52 and against which the arms can be moved, as can best be seen in FIG. 6. Each of the guide rings mounts a cam plate 77 extending inwardly of the mobile frame from the guide ring. Each cam plate extends about its respective guide ring from a position on the ring approximately 45° rearwardly from a vertical plane passing through the axis of the mounting shaft 47 to a position approximately 135° therefrom about the ring roughly coinciding with the point of intersection of a vertical reference plane passing through the mounting shaft and the guide ring above the mounting shaft. For illustrative convenience, this relationship is shown in a horizontal development in FIG. 13 wherein the cam plates extend from positions of approximately 135° to approximately 270° with respect to the horizontal development.

A guide frame 78 is secured on each side wall 33 of the mobile frame 30 adjacent to the rearward portion 32 thereof extending forwardly under the circumference defined by the path of travel of the picking portions 53 of the picking arms 52 and thence upwardly between the paths of travel of the pairs of opposed picking arms to a position downwardly adjacent to the respective guide ring 76 of that side wall, as shown in FIG. 8. An arcuate guide arm 79 is secured on the remote upwardly extending end of the guide frame approximately concentric to the guide ring. As shown in the horizontal development of FIG. 13, the guide arms extend from positions of approximately 45° to positions of approximately 135°.

As best shown in FIG. 13, the guide arms are spaced from their adjacent guide rings to define first or normal paths of travel 80 between each guide arm and adjacent guide ring. The area between the guide arms defines a picking station or position 81 and the arms define second or picking paths of travel 82 for the picking arms therealong through the picking station. Thus, the paths of travel for the picking arms during rotation of the picking wheel assembly 45, as viewed in FIG. 13, extend along the guide rings, through either the first paths of travel 80 or the second paths of travel 82, inwardly along the cam plates 77, and thence outwardly into engagement with the guide rings in a release station or position 83. Each of the guide arms 79 mounts a control spring 84 extending rearwardly from the arm to a position opposite the adjacent end of its respective cam plate to control the passage of the guide arms from the first and second paths of travel to the cam plates.

As can best be seen in FIG. 3, a receiving trough 90 is secured on the side walls 33 extending therebetween in a predetermined position between the picking wheel assembly 45 and the platform 39 in the forward portion 31 of the mobile frame 30. The trough is composed generally of a lower discharge chute 91 communicating with a discharge opening 92 in the side wall on the left, as viewed in FIG. 8, and an upper discharge chute 93 extending upwardly and rearwardly from the lower discharge chute between the paths of travel for the picking arms 52. The upper discharge chute mounts a pair of cam arms 94 extending rearwardly in deflecting relation to the picking arms positively to direct the arms from their paths of travel between the cam plates 77 to the paths of travel in engagement with the guide rings 76. A suitable container 95, as shown in FIGS. 1, 3 and 8, is secured on the side wall over the discharge opening 92 for collection of the harvested mushrooms. The upper discharge chute 93 has a pair of integral, upwardly extending and inwardly curved guide plates 96 to insure that the picking portions 53 of the picking arms 52 do not catch on the upper discharge chute during passage thereby.

A control assembly, adapted to control direction of the picking arms 52 along the respective first and second paths of travel 80 and 82, is generally indicated by the numeral 100 in FIG. 3. The control assembly includes a solenoid 101 mounted on the platform 39 and operably mounting an armature 102 rearwardly extended therefrom. A cross plate 103 is mounted on the armature extending transversely of the frame through slots 104 in the side walls 33. A pair of mounts 105 are fastened on the exterior of each of the side walls and a slide member 106 is received for slidable movement in each pair of mounts along substantially horizontal paths of travel. A first spring 107 interconnects each slide member and the side wall adjacent to the rearward portion 32 of the mobile frame to urge the member into a retracted position.

An angled control plate 108 is extended through a passage 109 in each slide member 106 adjacent to the forward portion 31 of the mobile frame and through a notch 110 in its respective side wall so as to extend inwardly of the mobile frame to a position immediately forwardly of the guide arms 79, as best shown in FIG. 13. As can be seen in FIG. 4, a second spring 111 interconnects the outwardly extending end of each control plate 108 and its respective side wall 33 so as resiliently to urge the inwardly extending ends of the control plates toward the interior of the mobile frame and to increase such urging of the control plates upon slidable movement of the slide members 106 toward the forward portion of the frame. Each of the slide members is connected to the remotely extending end of the cross plate 103 by a linkage 112. Thus, operation of the solenoid 101 to retract the armature 102 causes the slide members 106 to be drawn toward the forward portion of the frame thereby causing pivotal movement of the control plates 108 within the frames to urge picking arms 52 passing thereby into the second paths of travel 82 defined by the guide arms 79.

A mechanism for sensing the maturity of mushrooms passing in relative movement through the apparatus 10 during its passage along the row is generally indicated by the numeral 120 mounted on the forward portion 31 of the mobile frame 30. The mechanism has a mounting frame 121 secured on the side walls 33 of the frame in the forward portion thereof for adjustable movement longitudinally of the forward portion of the frame with the assistance of a suitable adjustment assembly 122 interconnecting the frame and the adjacent end wall 34. As can best be seen in FIG. 7, the mounting frame is U-shaped and mounted so as to straddle the passage extending longitudinally of the apparatus defined by the openings 35 of the end walls 34. A pair of rearwardly convergent gates 123 are borne by the frame for pivotal movement toward and from each other. Each of the gates mounts a roller 124 at the remote end thereof. The gates are resiliently retained in the rearwardly convergent relationship shown in FIG. 5 by a tension spring assembly 125 interconnecting the gates.

First and second spring members 130 and 131 respectively are fastened on the upper discharge chute 93 extending therebelow, as shown in FIGS. 6, 11 and 13, between the paths of travel of the picking arms 52. The first spring member 130 is tensioned resiliently to urge picking arms following the first paths of travel 80 into outward engagement with the guide rings 76. The second spring member 131 is stressed resiliently to urge picking arms following the second paths of travel 82 into outward engagement with the guide arms 79, as can best be seen in FIG. 13.

A power system 135 for the apparatus 10 is diagrammatically represented in FIG. 14. The system includes a master switch 136 mounted on the end wall 34 in the rearward portion 32 of the mobile frame 30. A normally open first micro switch 137 is secured on the gate 123 on the left as viewed in FIG. 7. A trip arm 138 is extended from the opposite gate upwardly over the passage defined by the opening 35 of the adjacent end wall 34 and downwardly to a predetermined position for engagement with the first micro switch when the gates are pivoted from each other a predetermined distance. A normally open second micro switch 139 is mounted on the side wall 33 on the left as viewed in FIG. 7 above the platform 39. A trip arm 140 is fastened on the cross plate 103 for engagement with the micro switch upon retraction of the cross plate by the solenoid 101. A normally closed third micro switch 141, having an elongated switch arm 142, is mounted on the under side of the lower discharge chute 91 with the switch arm extending rearwardly for actuating engagement by the second spring member 131 upon admission of a pair of picking arms 52 to the second paths of travel 82, as can best be visualized in FIG. 5.

An electrical circuit 150 for the power system 135 of the apparatus 10 is diagrammatically illustrated in FIG. 14. The circuit includes an electrical conductor 151 extended through the electric cord 66 in the conventional fashion for connection through an electric plug, not shown, borne by the cord to a source of electrical energy. Conductor 151 is connected at the other of its ends to the master switch 136. An electrical conductor 152 interconnects the master switch with the first micro switch 137. An electrical conductor 153 interconnects the first micro switch 137 and the solenoid 101. An electrical conductor 154 interconnects the solenoid and is extended through the electrical cord and connected to the electric plug, not shown, as is conductor 151. The electric drive motor 64 is wired so as to interconnect conductors 152 and 154 by conductors 155 and 156. The band saw motor 70 is wired in parallel with the electric drive motor 66 in the circuit by conductors 157 and 158 interconnecting the motor with conductors 152 and 154 respectively. An electrical conductor 159 interconnects conductor 152 and the third micro switch 141. An electrical conductor 160 interconnects the third micro switch and the second micro switch 139. An electrical conductor 161 interconnects the second micro switch and conductor 153 so as to wire micro switches 137 and 141 in parallel in the circuit.

OPERATION

The operation of the described embodiment of the subject invention is believed to be clearly apparent and is briefly summarized at this point. As previously described, the mushrooms 19 are grown in rows on the tables 11 in the interstices 17 defined by the planks 15, as shown in FIGS. 1 and 2. As a result of the practice of the method of the present invention, such mushrooms grow only in the interstices so as to form rows suitable for picking by the apparatus 10.

As previously noted, it is apparent that several of the apparatus 10 can be used in a team interconnected by suitable members so as to harvest mature mushrooms from all of the rows of a given table in one operation on a daily basis. However, regardless of whether the apparatus are used individually or in teams, the operation is substantially the same in each instance and is described herein with respect to one such apparatus.

The apparatus 10 is positioned on a pair of planks 15 aligned so that the wheel assemblies 36 and 37 are in position to traverse the planks longitudinally of the row with the row passing in relative movement through the apparatus along the path defined by the openings 35 of the end walls 34. The electric cord 66 is connected through a suitable extension cord, if necessary, to a source of electrical energy. It will be noted that no artifical lighting is required for operation of the apparatus. Thus, no disruption of the environment conducive to growth of the mushrooms 19 is required for operation of the apparatus.

Subsequently, the master switch 136 is closed by switching it to an on condition thereby completing the electrical circuit 150 to supply electrical energy to the motors 64 and 70. The motor 64 operates the rear wheel assemblies 37 to propel the apparatus at a suitable rate of speed along the row. Simultaneously, the mounting shaft 47 of the picking wheel assembly 45 is rotated so as to rotate the picking arms 52 therewith in a counterclockwise direction, as viewed in FIG. 4. At the same time, motor 70 operates the band saw blade 72.

The sensing mechanism 120 is preadjusted to position the gates 123 thereof in a preselected spacing designed to correspond to a diameter slightly smaller than that of the diameters of the caps 20 of mushrooms 19 determined to be of a mature size suitable for harvesting. Thus, it will be seen that the passage of a mushroom 19 having a cap 20 of a diameter of any size greater than the preselected spacing will cause the gates to be pivoted from each other so as to cause the trip arm 138 to close the normally open first micro switch 137. As can best be visualized in FIG. 7, movement of both or either gate causes tripping of the first micro switch if such movement defines a diameter between the rollers 124 of any size greater than the spacing selected.

Upon the passage of a mature mushroom 19 through and between the gates 123, the electrical circuit 150 is completed through the first micro switch 137 to the solenoid 101 to cause retraction of the armature 102. Since the first micro switch is only closed a relatively brief interval controlled by the passage of a mushroom between the gates and then again resumes its normally open position, the second micro switch 139 is in position to be tripped by the trip arm 140 of the cross plate 103 so as to continue the flow of current through the normally closed third micro switch 141 and normally open second micro switch 139 after passage of the mushroom from between the gates. Thus, the solenoid continues to retract the armature and to hold it in the retracted position until the normally closed third micro switch is opened.

Retraction of the cross plate 103 of the control assembly 100 moves the slide members 106 toward the forward portion 31 of the mobile frame 30 so as to move the control plates 108 farther inwardly of the interior of the frame to the positions shown in FIG. 13 as previously described. Thus, a pair of opposed picking arms 52 are pivoted on their hinge assemblies 51 by the control plates toward each other and along the second paths of travel 82 defined by the guide arms 79. Previous adjustment of the distance between the picking station 81 and the gates 123 accomplished by adjustment of the mounting frame 121 forwardly or rearwardly in coordination with the rates of speed of the picking wheel assembly and the mobile frame, results in the picking arms, which have been deflected by the control plates 108, reaching the picking station simultaneously with the mushroom which operated the sensing mechanism 120. Thus, the picking portions 53 of the picking arms slide under the cap 20 of the mushroom and lightly engage the stalk 21 thereof. The selected pair of picking arms thus engage the mushroom in the relationship shown in FIG. 8. The arms continue passage through the picking station and upwardly with the picking wheel assembly so as to pull the mushroom from the nonfertile material 18 and carry the mushroom therewith. As previously described, it has been found that by growing the mushrooms in the practice of the method of the present invention, pulling of the mushrooms from the nonfertile material operates cleanly to separate the mushroom from the mycelium contained in the growing medium 14 leaving, at most, only a few strands of the mycelium in connection with the stalk 21 of the mushroom.

The mushroom 19 is thus carried by the picking arms 52 from the picking station 81 and along the path of travel between the cam plates 77 upwardly through the frame 30 to the release station 83. During passage of a picked mushroom borne by the picking arms between the cam plates 77, the stalk 21 of the mushroom is carried by the operating band saw blade 72 so as automatically to trim off the remote portion of the stalk and any strands of mycelium borne thereby. The trimmings can be collected by any suitable means, not shown. Thus, the harvested mushrooms are of a uniform size and maturity not requiring further trimming.

Upon release by the cam plates 77 and with the positive assistance of the cam arms 94, the pair of picking arms 52, upon reaching the release station 83, are separated to travel into outward engagement with the guide rings 76 so as to discharge the picked mushroom 19 down the upper discharge chute 93, through the lower discharge chute 91 and out the discharge opening 92. As previously described, a suitable container, such as at 95 carried by the side wall 33 in receiving relation to the discharge opening 92 accumulates the picked mushrooms for subsequent collection.

It will be apparent that where a mushroom 19 is not yet of a mature size to trip the first micro switch 137, the control assembly 100 will not operate to position the control plates 108 and thus, the picking arms 52 which would ordinarily have picked the designated mushroom will simply pass along the first paths of travel 80 between their respective guide arms 79 and the adjoining guide rings 76 without passing through the picking station. Thus, the immature mushroom will simply pass through the apparatus and out through the opening 35 of the end wall 34 at the rearward portion 32 of the mobile frame being undisturbed by passage of the apparatus thereover.

When the apparatus 10 reaches the end of a row of mushrooms 19, the master switch 136 is opened by switching it to an off condition thus stopping the apparatus. The harvested mushrooms are then collected by removal of the suitable container, not shown. The apparatus can then be repositioned at the end of another row for continued harvesting operations.

Therefore, the method and apparatus of the present invention make possible the harvesting of mushrooms on a commercial basis in a fully automated operation having the capability of discriminately harvesting only those mushrooms of a preselected maturity while leaving undisturbed those mushrooms not yet of the mature size, automatically trimming the harvested mushrooms, and making possible the growth of new mushrooms without further attenton to the growing tables.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An apparatus for harvesting a crop composed of individual growths to be harvested, the apparatus comprising a plurality of pairs of opposed arms; guide means associated with said arms of each pair for direction of said arms of each pair along a path of travel toward each other in a picking position and away from each other in a releasing position; a mobile frame mounting said plurality of pairs of arms and said guide means for movement relative to the crop to be harvested whereby said crop moves through the picking position; means for rotationally moving the plurality of pairs of arms about an axis of rotation in radial extension therefrom along said path of travel directed by the guide means; and means borne by the frame in connection with the guide means for individually sensing each growth, having reached a preselected state of maturity, during movement of the mobile frame relative to the crop and discriminately operating the guide means to direct a pair of said arms toward each other into juxtaposition in the picking position to pick each of said mature growths.

2. The apparatus of claim 1 wherein said guide means defines first paths of travel directing the arms of each pair laterally of the picking position unless operated by the sensing means to direct a pair of arms into the picking position.

3. The apparatus of claim 2 wherein the growths are mushrooms each having an enlarged, elevated cap portion and said arms have inwardly bent grasping portions oriented in the picking position to move on opposite sides of and beneath said cap portions and continuing to rotate about said axis of rotation subsequently to rotate from the picking position to lift and carry said mushrooms therewith.

4. The apparatus of claim 3 wherein the guide means defines second paths of travel through the picking position to the release position wherein said arms directed to the picking position are retained in said juxtaposition during movement to the release position to carry said mushroom therewith.

5. The apparatus of claim 4 wherein the release position is elevated from said picking position and a cushion is mounted on the frame disposed between said picking and release positions inwardly spaced from the grasping portions of said juxtaposed arms with respect to the axis of rotation to prevent gravitational displacement of mushrooms carried by said arms.

6. The apparatus of claim 5 wherein a receiving trough is mounted on the mobile frame in mushroom receiving relation to the release position.

7. The apparatus of claim 6 wherein the guide means causes the juxtaposed arms to retract from each other in the release position to release a mushroom borne thereby.

8. The apparatus of claim 7 wherein said sensing means includes a pair of opposed gates mounted on the frame for pivotal movement toward and from each other defining a path of travel therebetween to the picking position and connected to a switch adapted to control introduction of opposed arms to the guide means upon movement of said gates from each other by the passage of a mushroom of preselected size therebetween.

9. The apparatus of claim 8 wherein a cutting means is borne by the frame juxtaposed the path of travel of the arms intermediate the picking and release positions for trimming the mushrooms during passage thereof to the release position.

10. An apparatus for harvesting mushrooms grown in rows in beds and adapted for operation in a confined environment to pull from the beds only those mushrooms having reached a pre-selected state of maturity, the apparatus comprising a mobile frame having predetermined forward and rearward positions; means for propelling said frame along a row of said mushrooms; a picking wheel assembly mounted for rotational movement in the frame about an axis disposed substantially transversely of said frame and including a plurality of radial extending picking arms disposed in pairs aligned transversely of the frame and pivotal toward and from each other; guide means borne by the frame for individual selective direction of the pairs of picking arms along normal paths of travel spaced from each other and alternatively along picking paths of travel into juxtaposition in a lower picking station, upwardly in juxtaposition from said alternative paths of travel and thence from each other in a release station; a pair of opposed gates mounted on the forward portion of the frame pivotal toward and from each other to define a path of travel for mushrooms relative to the harvesting apparatus between the gates and through the picking station; and control means interconnecting the gates and the guide means operable upon movement of the gates from each other by a mushroom passing therethrough to direct a pair of arms into the picking paths of travel defined by the guide means to cause said pair of arms to pick said mushroom in the picking station and to release said mushroom in the release station.

11. An apparatus for harvesting the mature growth of a crop, the apparatus comprising a frame having a picking station and adapted for movement relative to the crop to cause the growths of the crop to be passed in relative movement through the picking station; pairs of arms pivotally borne by the frame for picking the growths; means affixed on the frame for individually sensing mature growths; and guide means mounted on the frame in connection with the sensing means for urging said arms of said pairs toward each other and into the picking station, upon sensing of a mature growth by the sensing means, to pick said mature growth in the picking station, and resilient means between said arms resisting said movement toward each other.

12. An apparatus for harvesting a crop composed of growths, the apparatus comprising a frame adapted for movement relative to the crop; a pair of arms mounted on the frame for movement along a path of travel; means for moving the arms along the path of travel; means for guiding the arms during said movement along the path of travel to predetermined positions of juxtaposition in a picking position; and means limiting the approach of said arms to each other in said picking position wherein the arms are spaced to a predetermined distance apart corresponding to the size of growths to be harvested whereby said growths are gently and positively engaged by the arms and harvested by continued movement of the arms along the path of travel and growths of smaller size are not harvested.

13. The apparatus of claim 12 wherein said growths individually have predetermined portions to be protected and said arms are shaped to preclude contact with said portions to be protected during harvesting.

14. The apparatus of claim 13 including means borne by the frame for individually sensing the growths having reached a maturity suitable for harvesting and connected in controlling relation to said guide means to cause the guide means to guide the arms to the picking position only when a growth having reached said maturity is sensed.

15. The apparatus of claim 14 wherein said guide means defines first paths of travel directing the arms laterally of the picking position unless operated by the sensing means to guide the arms into the picking position.

16. The apparatus of claim 15 wherein said portion to be protected of each growth is enlarged and elevated relative to the remainder of the growth and said arms have inwardly extending grasping portions directed by the guide means in the picking position to move on opposite sides of and beneath the enlarged portion to be protected and to engage said growth therebelow.

17. A harvesting apparatus comprising a pair of opposed arms, guide means associated with said arms for direction of the arms along a path of travel toward each other in a picking position and from each other in a release position, a mobile frame mounting said arms and said guide means for movement relative to a crop to be harvested whereby said crop moves through the picking position, means for moving the arms along said path of travel to pick the crop in the picking position and to discharge the crop in the release position, and means borne by the frame for sensing said crop and operating the guide means in response thereto to pick only those portions of the crop having achieved maturity.

* * * * *

UNITED STATES PATENT AND TRADEMARK OFFICE
CERTIFICATE OF CORRECTION

PATENT NO. : 3,970,150
DATED : July 20, 1976
INVENTOR(S) : Gibson Jr. et al

It is certified that error appears in the above-identified patent and that said Letters Patent are hereby corrected as shown below:

Column 9, Line 9
    delete "on" and
    insert --- "on" ---.

Column 10, Line 53
    delete "off" and
    insert --- "off" ---.

Signed and Sealed this

Sixteenth Day of November 1976

[SEAL]

Attest:

RUTH C. MASON
*Attesting Officer*

C. MARSHALL DANN
*Commissioner of Patents and Trademarks*